(12) United States Patent
Weiner et al.

(10) Patent No.: US 8,489,140 B2
(45) Date of Patent: Jul. 16, 2013

(54) SYSTEM AND METHOD FOR PROVIDING PRODUCT OR SERVICE WITH CELLULAR TELEPHONE

(75) Inventors: Avish Jacob Weiner, Tel Aviv (IL); Dror Fixler, Ganei Tikva (IL)

(73) Assignee: AcCells Technologies (2009), Ltd., Petach Tikva (IL)

( * ) Notice: Subject to any disclaimer, the term of this patent is extended or adjusted under 35 U.S.C. 154(b) by 98 days.

(21) Appl. No.: 12/922,558

(22) PCT Filed: Mar. 9, 2009

(86) PCT No.: PCT/IL2009/000263
§ 371 (c)(1),
(2), (4) Date: Sep. 14, 2010

(87) PCT Pub. No.: WO2009/113057
PCT Pub. Date: Sep. 17, 2009

(65) Prior Publication Data
US 2011/0021181 A1      Jan. 27, 2011

Related U.S. Application Data

(63) Continuation of application No. 12/048,475, filed on Mar. 14, 2008, now Pat. No. 7,706,784.

(60) Provisional application No. 61/085,548, filed on Aug. 1, 2008, provisional application No. 61/085,549, filed on Aug. 1, 2008.

(51) Int. Cl.
*H04M 1/00* (2006.01)

(52) U.S. Cl.
USPC ........ 455/550.1; 455/550; 455/451; 455/452; 455/453; 455/454

(58) Field of Classification Search
USPC .................. 455/550.1, 451–454
See application file for complete search history.

(56) References Cited

U.S. PATENT DOCUMENTS 6,584,309 B1    6/2003    Whigham
7,209,741 B2    4/2007    Julka et al.
(Continued)

FOREIGN PATENT DOCUMENTS

EP    1424861 A1 *    6/2004
WO    9834421 A2    8/1998
WO    2007048976 A2    4/2007

OTHER PUBLICATIONS

Simon S. Lam, A Carrier Sense Multiple Access Protocol for LOcal Network, North-Holland Company, Computer Networks vol. 4, Feb. 1980, pp. 21-32.*

(Continued)

*Primary Examiner* — Fayyaz Alam
*Assistant Examiner* — Mohammed Rachedine
(74) *Attorney, Agent, or Firm* — Simon Kahn; Chanoch Kahn

(57) ABSTRACT

The present disclosure provides for a mobile communication device identifier, constituted of: a shielding defining a coverage area, the shielding arranged to attenuate radio signals originating externally of the coverage area to be less than a pre-determined signal strength; an antenna associated within the defined coverage area; a transceiver coupled to the antenna, the transceiver operative to communicate with a mobile station inserted within the defined coverage area utilizing a signal strength greater than the pre-determined signal strength; and a service control unit responsive to the transceiver, the service control unit operative responsive to the communication to output a signal indicative of an authorization to provide a product or service.

20 Claims, 7 Drawing Sheets

U.S. PATENT DOCUMENTS

| | | | |
|---|---|---|---|
| 7,310,307 | B1 | 12/2007 | Das et al. |
| 7,359,885 | B2 | 4/2008 | Yan |
| 7,366,913 | B1 | 4/2008 | Haley |
| 7,482,925 | B2 | 1/2009 | Hammad et al. |
| 2001/0014870 | A1 | 8/2001 | Saito et al. |
| 2003/0056114 | A1 | 3/2003 | Goland |
| 2003/0193441 | A1 | 10/2003 | Zimmerman |
| 2004/0023647 | A1 | 2/2004 | Mazzara et al. |
| 2004/0121781 | A1 | 6/2004 | Sammarco |
| 2004/0142685 | A1 | 7/2004 | Glasser et al. |
| 2005/0170842 | A1 | 8/2005 | Chen |
| 2005/0176482 | A1 | 8/2005 | Raisinghani et al. |
| 2005/0185626 | A1 | 8/2005 | Meier et al. |
| 2005/0242921 | A1 | 11/2005 | Zimmerman et al. |
| 2005/0255889 | A1 | 11/2005 | Haseba et al. |
| 2006/0033608 | A1 | 2/2006 | Juels et al. |
| 2006/0044115 | A1 | 3/2006 | Doi et al. |
| 2006/0100983 | A1* | 5/2006 | Atkinson et al. .................. 707/1 |
| 2006/0271643 | A1 | 11/2006 | Stallman |
| 2007/0016518 | A1* | 1/2007 | Atkinson et al. ................ 705/38 |
| 2007/0140188 | A1 | 6/2007 | Melkote et al. |
| 2007/0264963 | A1* | 11/2007 | Srinivasan et al. ......... 455/343.2 |
| 2008/0084272 | A1 | 4/2008 | Modiano |
| 2008/0096494 | A1 | 4/2008 | Chan et al. |
| 2008/0114699 | A1 | 5/2008 | Yuan et al. |

OTHER PUBLICATIONS

International Search Report for Parallel PCT Application PCT/IL2009/000263 Issued by European Patent Office, of Mailing Date Jul. 6, 2009.

Written Opinion of the International Searching Authority for Parallel PCT Application PCT/IL2009/000263 Issued by European Patent Office, of Mailing Date Jul. 6, 2009.

USPTO Office Action for parent case U.S. Appl. No. 12/048,475, of Mailing Date Oct. 24, 2008.

Response to USPTO Office Action for parent case U.S. Appl No. 12/048,475, of Mailing Date Oct. 24, 2008, Filed Dec. 9, 2008.

USPTO Final Office Action for parent case U.S. Appl. No. 12/048,475, of Mailing Date Feb. 2, 2009.

Response to USPTO Final Office Action for parent case U.S. Appl. No. 12/048,475, of Mailing Date Feb. 2, 2008, Filed Apr. 23, 2008.

USPTO Office Action for parent case U.S. Appl No. 12/048,475, of Mailing Date May 18, 2009.

Response to USPTO Office Action for parent case U.S. Appl. No. 12/048,475, of Mailing Date May 18, 2009, Filed Jul. 18, 2009.

Supplemental Response to USPTO Office Action for parent case U.S. Appl. No. 12/048,475, of Mailing Date May 18, 2009, Filed Aug. 12, 2009.

USPTO Final Office Action for parent case U.S. Appl. No. 12/048,475, of Mailing Date Sep. 16, 2009.

Response to USPTO Final Office Action for parent case U.S. Appl. No. 12/048,475, of Mailing Date Sep. 16, 2009, Filed Nov. 5, 2009.

First Office Action from China Patent Office for Parallel Application—CN 200980113807.3.

Third Office Action for parallel China Patent Application 200980113807.3 dated Dec. 11, 2012.

Office Action for parallel European Patent Application 09 720 002.6-1238 mailed Jan. 17, 2013.

* cited by examiner

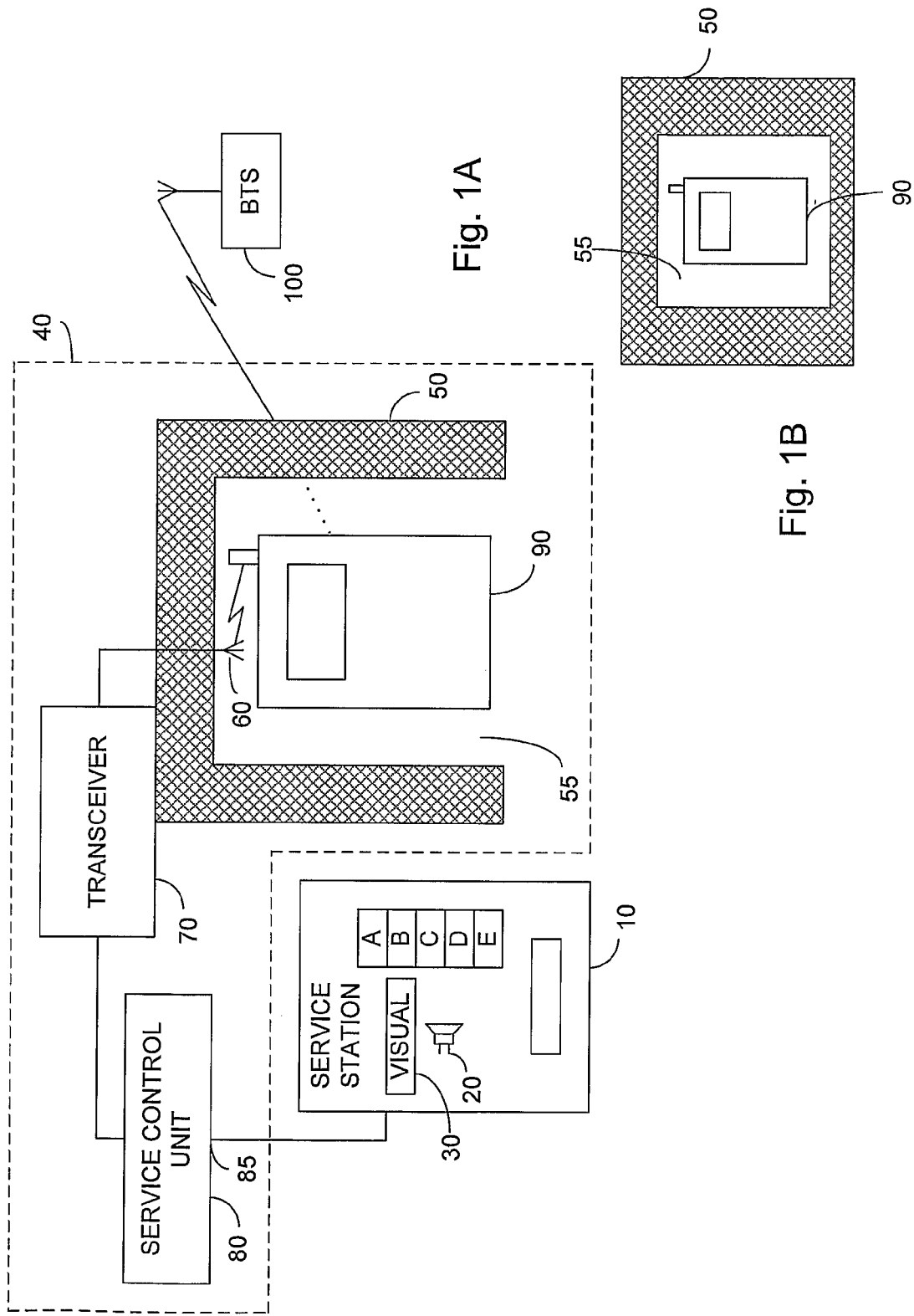

SYSTEM AND METHOD FOR PROVIDING PRODUCT OR SERVICE WITH CELLULAR TELEPHONE

TECHNICAL FIELD

The present disclosure relates generally to the field of cashless transaction devices and in particular to a system and method for providing a product or service with a cellular telephone.

BACKGROUND ART

A mobile station, also called a mobile communication device, mobile phone, mobile telephone, hand phone, wireless phone, cell phone, cellular phone, cellular telephone, mobile handset or cell telephone, is a long-range electronic device used for mobile voice or data communication over a network of base stations. The base stations are each typically called a cell site, a Base Transceiver Station (BTS), an eNode-B or a Node-B, and in cooperation provide for seamless communication for the mobile communication device over a large geographic area. A particular feature of mobile stations is the ability to establish communication via any one of a network base stations, and seamlessly hand-off from one base station to another. A network supporting such a mobile station is typically called a cellular network, since the various base stations of the network define cells in which their radio signal is dominant and have a pre-selected Location Area Identification (LAI), Location Area Code or Location Area Color (LAC), collectively denoted herein as an LAI. Additionally, data communication services have been added to the cellular network, thus providing a large range of features, in addition to voice communication, for the mobile station user. As a result of the above mentioned convenience, mobile stations have rapidly grown in use.

Historically, mobile stations have been associated with charges for phone usage, air time and messaging. However, the ubiquitous mobile station, having an associated means for user identification and charging expenses, presents an opportunity to utilize the mobile communication device as an electronic wallet. In particular, a mobile station may be used as a medium by which payments may be initiated, activated or confirmed.

There are several known methods for providing a product, and in particular, payment for products or services other than phone usage or airtime, by using a mobile station. In one system known to the prior art, as described in U.S. Pat. No. 6,584,309 issued Jun. 24, 2003 to Whigham, the entire contents of which is incorporated herein by reference, a consumer requests a product available from a vending machine by dialing a specified telephone number, typically via their mobile station, to a server. The server recognizes the request for the product, creates a transaction record including a billing record for billing the consumer, and communicates a vend code to the consumer's mobile station. The consumer then transmits the received vend code to the machine providing the product.

Unfortunately, such a system is inconvenient requiring a number of steps to perform a simple transaction. Additionally, when the vend code is received, there is no certainty that the consumer is standing by the vending machine and ready to receive the service, and the consumer may thus be charged for a product which he does not receive.

U.S. Patent Application Publication S/N 2008/0084272 A1, published Apr. 10, 2008 to Modiano, the entire contents of which is incorporated herein by reference, is addressed to a method for automatic electronic authorization for entry into a geographic area based on detection of a mobile station operable on a GSM network. Disadvantageously, in the event that a plurality of subscribers, each having a mobile station, request entry contemporaneously, no method is provided to distinguish between the subscribers. Thus, for example, the charge for entry of a vehicle carrying a plurality of subscribers may be improperly attributed.

Other methods of payment, for example, a method called Near Field Communication (NFC), requires a mobile station supporting an additional low power, short distance, communication protocol. In one embodiment, payment via NFC includes pre-loading a smart card installed in the mobile station, for example, a Subscriber Identity Module (SIM) or Universal Integrated Circuit Card (UICC), with an amount of money, and the machine providing the product or service is provided with compatible hardware. Alternatively, credit card or debit card information may be loaded into the smart card. The money may be subtracted from the pre-loaded amount on the smart card or from the credit card account. This method, however, typically requires a special design or modification of the mobile station to include communication elements separate from the telecommunications elements required for mobile communications. Thus, the use of NFC is limited to mobile stations supporting this protocol, and is thus not applicable to 100% of the potential mobile station users.

What is desired is a method and system for payment using a mobile station without requiring additional hardware in the mobile station and without requiring additional steps by the consumer.

SUMMARY OF INVENTION

In view of the discussion provided above and other considerations, the present disclosure provides methods and apparatus to overcome some or all of the disadvantages of prior and present methods of providing products or services using a mobile communication device. Other new and useful advantages of the present methods and apparatus will also be described herein and can be appreciated by those skilled in the art.

In one embodiment, a shielding is provided defining a coverage area, the shielding arranged to attenuate radio signals originating from any antenna outside of the coverage area to be less than a pre-determined signal strength. An antenna is provided associated with the defined coverage area, and preferably within the defined coverage area, and coupled to a transceiver. The transceiver is operative to communicate with any mobile station placed within the defined coverage area with a radio signal greater than the pre-determined strength. A service control unit is provided and arranged to be responsive to the communication between the transceiver and the mobile station. A service station providing a product or service, preferably in proximity to the defined coverage area, is operative to provide the product or service responsive to the service control unit.

Certain embodiments thus provide for a system for providing a product or service using a mobile station, the system comprising: a shielding defining a coverage area, the shielding arranged to attenuate radio signals originating externally of the coverage area to be less than a pre-determined signal strength; an antenna arranged associated with the defined coverage area; a transceiver coupled to the antenna, the transceiver operative to communicate via the antenna with a mobile station inserted within the defined coverage area utilizing a signal strength greater than the pre-determined signal strength; a service control unit; and a service station responsive to the service control unit, the service station operative to provide the product or service, the service control unit operative responsive to the communication to enable the service station to provide the product or service.

In one further embodiment, the communication between the transceiver and the mobile station is in accordance with an established cellular network protocol. In another further embodiment the service control unit is further operative to prevent the service station from providing the product or service in the event that a plurality of mobile stations are contemporaneously present within the defined coverage area.

In one further embodiment the shielding defining the coverage area at least partially defines a Faraday cage. In another further embodiment the transceiver is associated with a location area identifier different than a location area identifier experienced by the mobile station immediately outside the defined coverage area. In yet another further embodiment the service station further comprises one of an audible notifier and a visual notifier, wherein the service station is arranged to audibly or visually notify the user via the respective one of the audible notifier and the visual notifier in the event that the product or service provision is not enabled.

In one further embodiment, the transceiver is further in communication with a cellular network, and wherein the service control unit is operative to detect a network authorization symbol sent by the cellular network to the mobile station via the transceiver, the enabling of the service station responsive to the detection of the network authorization symbol.

In one yet further embodiment the transceiver is a base station of the cellular network. In another yet further embodiment, the system further comprises an application server in communication with the cellular network, the application server operative to receive an identification of the mobile station from the cellular network, and alternately provide an authorization of the service, or deny an authorization of the service, responsive to the received identification of the mobile station, the cellular network operative to provide the network authorization symbol responsive to the provided authorization. Preferably, the application server is further operative to debit a user associated with the mobile station for the provision of the product or service. In yet another further embodiment the network authorization symbol is part of a cellular network mobile station positioning management procedure.

In one further embodiment the system further comprises a radio access network emulator coupled to the transceiver, the radio access network emulator operative to receive identification information from the mobile station. In one yet further embodiment the radio access network emulator is operative to: broadcast a signal with the signal strength greater than the pre-determined signal strength; receive a location update request responsive to the broadcast signal; and transmit, responsive to the received location update request, an identity request, wherein the received identification information is responsive to the transmitted identity request. In another yet further embodiment the system further comprises a database of authorized identification information in communication with the service control unit, the service control unit operative to enable the service provision responsive to the received device identification information consonant with authorized identification information on the database.

Independently, certain embodiments provide for a mobile station identifier device, comprising: a shielding defining a coverage area, the shielding arranged to attenuate radio signals originating externally of the coverage area to be less than a pre-determined signal strength; an antenna associated with the defined coverage area; a transceiver coupled to the antenna, the transceiver operative to communicate via the antenna with a mobile station inserted within the defined coverage area utilizing a signal strength greater than the pre-determined signal strength; and a service control unit operative responsive to the communication to output a signal indicative of an authorization to provide a product or service.

In one further embodiment the communication between the transceiver and the mobile station is in accordance with an established cellular network protocol. In another further embodiment the service control unit is further operative to prevent the service station from providing the product or service in the event that a plurality of mobile stations are contemporaneously present within the defined coverage area.

In one further embodiment the shielding defining the coverage area at least partially defines a Faraday cage. In another further embodiment the service control unit is operative to detect a network authorization symbol sent by a network to the mobile station, the indicative signal output responsive to the detection of the network authorization symbol.

In one further embodiment the mobile station identifier device further comprises a radio access network emulator coupled to the transceiver, the radio access network emulator operative to receive identification information from the mobile station. In one yet further embodiment the radio access network emulator is operative to: broadcast a signal with the signal strength greater than the pre-determined signal strength; receive an update request responsive to the broadcast signal; and transmit, responsive to the received update request, an identity request, wherein the received device identification information is responsive to the transmitted identity request. In another yet further embodiment the mobile station identifier device further comprises a database of authorized identification information in communication with the service control unit, the service control unit operative to output the indicative signal responsive to the received device identification information consonant with authorized identification information on the database.

Independently, certain embodiments provide for a method of providing a product or service using a mobile station, the method comprising: providing a shielding to define a coverage area, the shielding arranged to attenuate radio signals originating externally of the coverage area to be less than a pre-determined signal strength; communicating with a mobile station inserted within the defined coverage area utilizing a signal strength greater than the pre-determined signal strength; and enabling provision of the product or service responsive to the communication.

In one further embodiment the communication with the mobile station is in accordance with an established cellular network protocol. In another further embodiment the method further comprises: preventing, in the event that a plurality of mobile stations are within the defined coverage area, the provision of the product or service to any of the plurality of mobile stations.

In one further embodiment the provided shielding at least partially defines a Faraday cage. In another further embodiment the method further comprises associating a location area identifier with the provided coverage area different than a location area identifier experienced by the mobile station immediately outside the defined coverage area. In yet another further embodiment, the method further comprises visually or audibly notifying a user in the event that the product or service provision is not enabled.

In one further embodiment the communicating is responsive to a cellular network, the method further comprising: detecting a network authorization symbol sent by the cellular network to the mobile station, the enabling responsive to the detection of the network authorization symbol. In one yet further embodiment, the method further comprises: obtaining an identification of the mobile station; and providing an authorization of the product or service responsive to the obtained identification of the mobile station, the network authorization symbol sent responsive to the provided authorization of the product or service. In another yet further embodiment the method further comprises: debiting a user associated with the mobile station for the provision of the product or service.

In one further embodiment the method further comprises: retrieving identification information from the mobile station, the enabling responsive to retrieved identification. In another further embodiment the retrieving device information comprises: broadcasting a signal with the signal strength greater than the pre-determined signal strength; receiving an update request responsive to the broadcast signal; and transmitting, responsive to the received update request, an identity request, wherein the retrieved identification information is responsive to the transmitted identity request.

Additional features and advantages of the invention will become apparent from the following drawings and description.

BRIEF DESCRIPTION OF DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 1A illustrates a high level block diagram of an exemplary embodiment of a system providing a product or service in cooperation with a mobile station;

FIG. 1B illustrates a front view drawing of an exemplary embodiment of a shielding of FIG. 1A;

DESCRIPTION OF EMBODIMENTS

Figure 1C:
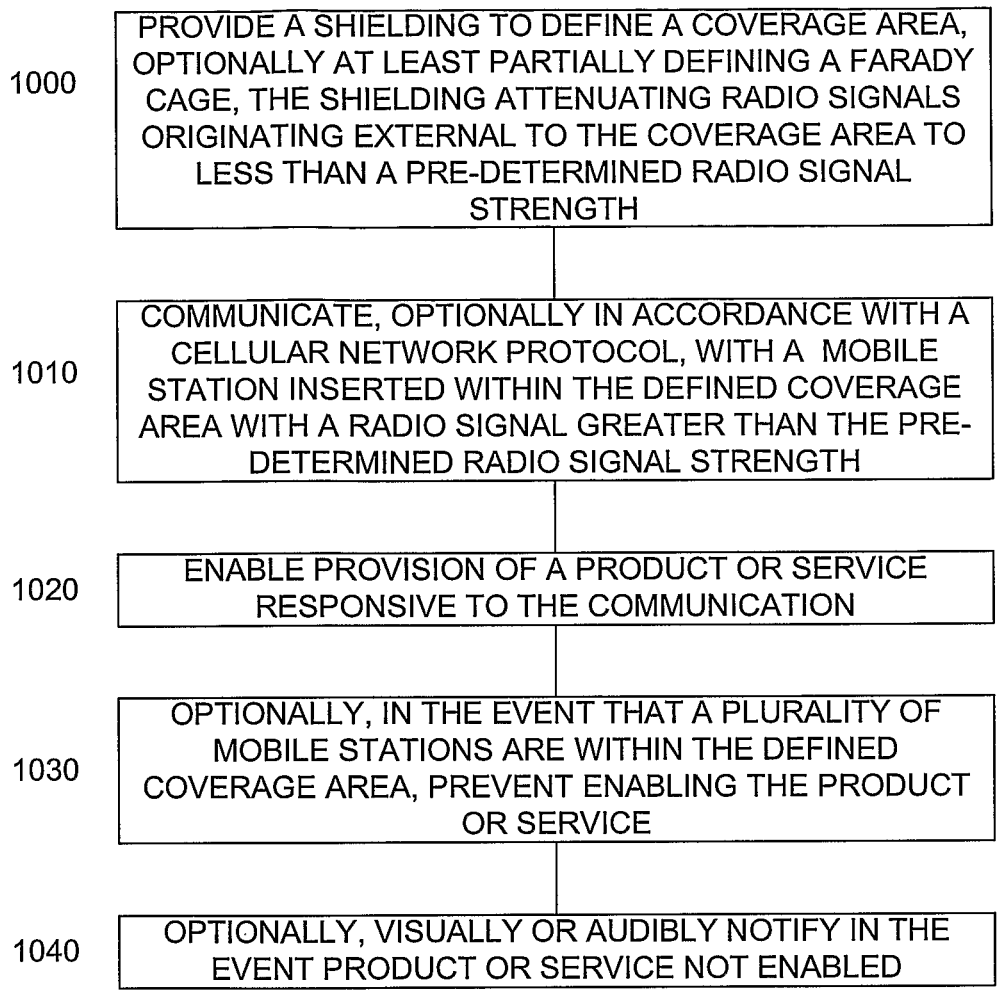
FIG. 1C illustrates a high level flow chart of an exemplary embodiment of the operation of the system of FIG. 1A.

Some of the present embodiments provide and enable providing a product or service responsive to a mobile station. In particular, a shielding is provided defining a coverage area, the shielding arranged to attenuate radio signals originating from any antenna outside of the coverage area to be less than a pre-determined signal strength. An antenna is provided associated with the defined coverage area, and preferably within the defined coverage area. The transceiver is operative to communicate with any mobile station placed within the defined coverage area with a radio signal greater than the pre-determined strength. A service control unit is provided and arranged to be responsive to the communication between the transceiver and the mobile station. A service station providing a product or service, preferably in proximity to the defined coverage area, is operative to provide the product or service responsive to the service control unit.

Before explaining at least one embodiment in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. In particular, the term connected as used herein is not meant to be limited to a direct connection, and allows for intermediary devices or components without limitation.

In the following description, the term mobile station refers to any mobile communication device, mobile phone, mobile telephone, hand phone, wireless phone, cell phone, cellular phone, cellular telephone, cell telephone, or other electronic device used for mobile voice or data communication over a network of base stations. Although in the following description, the communication is described using an example of cellular communication, particularly, global system for mobile communication (GSM), it will be understood that the scope of the invention is not limited in this respect, and that the communication method used may be based on any suitable communication protocol, including without limitation, Universal Mobile Telecommunications System (UMTS), IEEE 802.11x, IEEE 802.16x and CDMA.

The term mobile station positioning management procedure is meant to include any means for managing the connection of a mobile station to a cellular network, and is particular meant to be synonymous with, inter alia, the terms mobility management procedure in GSM, data mobility management, GPRS mobility management, and session mobility management in their respective systems.

FIG. 1A illustrates a high level block diagram of an exemplary embodiment of a system for providing a product or service in cooperation with a mobile station, comprising: a service station 10 comprising an optional audible notifier 20 and an optional visual notifier 30; a mobile station identifier device 40 comprising a shielding 50 defining a coverage area 55, an antenna 60, a transceiver 70 and a service control unit 80 exhibiting an output port 85; a mobile station 90; and a base transceiver station (BTS) 100. The term BTS as used herein is meant to include, for the respective network, an eNode-B or a Node-B, without limitation. FIG. 1B illustrates a front view drawing of shielding 50 arranged to at least partially form a Faraday cage surrounding a mobile station 90 inserted within shielding 50. Mobile station 90 may be inserted and removed by a user from coverage area 55 defined by shielding 50.

Antenna 60 is disposed within shielding 50 and is coupled to transceiver 70. Transceiver 70 is further in communication with service control unit 80. Output port 85 of service control unit 80 is coupled to service station 10. Service station 10 is preferably in proximity with mobile station identifier device 40, and in particular juxtaposed with shielding 50 of mobile station identifier device 40. BTS 100 is arranged to provide a radio signal so as to provide communication for all mobile stations 90 within radio range thereof. Shielding 50 is arranged to attenuate the radio signal from BTS 100, so that the signal strength of a radio signal from BTS 100 is less than a pre-determined radio signal strength within coverage area 55. Shielding 50 is preferably a three-dimensional structure, such as a box, cylinder or cone structure, and is further preferably constituted of a radio signal attenuating material so as to decrease the signal strength of radio signals transmitted by BTS 100 to be less than the pre-determined signal strength within coverage area 55. In one embodiment shielding 50 is configured and dimensioned so as to allow for the insertion of only a single mobile station 90 within coverage area 55 at a time, while held by a user. Transceiver 70 is preferably operative in accordance with a plurality of protocols and transmission frequencies so as to interact with a large plurality of types of mobile stations 90. In a preferred embodiment, transceiver 90 is operative to interact in accordance with each cellular protocol for which a cellular network is deployed surrounding shielding 50.

In operation, a mobile station 90 inserted within shielding 50 experiences an attenuation of a radio signal from BTS 100 to less than the pre-determined radio signal strength. The combination of transceiver 70 and antenna 60 are arranged to communicate with a mobile station 90 inserted within shielding 50 with a signal strength greater than the pre-determined radio signal strength. Thus, mobile station 90 prefers communication with transceiver 70 via antenna 60 over communication with BTS 100.

Mobile station 90 thus establishes communication with transceiver 70 within shielding 50, and mobile station 90 attempts replace any communication link previously established via BTS 100. Service control unit 80 is operative to monitor the communication between mobile station 90 and transceiver 70. In one embodiment, service control unit 80 is coupled to transceiver 70, and is operative to detect particular transmissions of data between transceiver 70 and mobile station 90 indicative that mobile station 90 is authorized to receive a product or service from service station 10. The detection of particular transmissions may be via a direct connection or via a wireless detection, without exceeding the scope.

Service control unit 80 is further responsive to the monitored communication to enable provision of a product or service from service station 10, by signaling service station 10 via output port 85 to enable the provision of the product or service. In the event that provision of the product or service is not enabled, service control unit 80 is further operative to provide a signal to service station 10 to provide one or more of an audible notification and a visual notification that provision of the product or service has been denied. Responsive to the received signal indicative of denial, service station 10 is operative to provide one or more of the audible notification, via audible notifier 20, and the visual notification via visual notifier 30.

In one embodiment, as described above, transceiver 70 is associated with an LAI different from an LAI associated with BTS 100. Thus, mobile station 90 is preferably operative to provide identification information as part of a location update procedure when entering coverage area 55 in accordance with established cellular communication protocols.

Preferably, service control unit 80 is further operative to prevent service station 10 from providing the product or service in the event that more than one mobile station 90 is detected within coverage area 55.

In one embodiment, and as described above, shielding 50 is juxtaposed with a particular service station 10. Thus, when a particular mobile station 90 is inserted within shielding 50, enabling of provision of a product or service is advantageously accomplished in cooperation with mobile station 90, thus ensuring that the ordering user actually receives the product or service.

There is no requirement that a single service control unit 80 or transceiver 70 be provided for each shielding 50, and in one embodiment a single service control unit is in communication with a plurality of transceivers 70, each in communication with a particular antenna 60 disposed within a particular shielding 50. In one embodiment, a single transceiver 70 is operative to control a plurality of antennas 60, each disposed within a particular shielding 50.

FIG. 1C illustrates a high level flow chart of an exemplary embodiment of the operation of the system of FIG. 1A. In stage 1000, shielding 50 is provided defining coverage area 55. Optionally, shielding 50 at least partially defines a Faraday cage. Shielding 50 is arranged to attenuate radio signals originating external to defined coverage area 55 to be less than a pre-determined radio signal strength.

In stage 1010, communication, optionally in accordance with a cellular network protocol, is established with mobile station 90 inserted within defined coverage area 55 of stage 1000. Communication is established via a radio signal exhibiting a signal strength greater than the pre-determined signal strength of stage 1000.

In stage 1020, provision of a product or service is enabled responsive to the communication of stage 1010. In optional stage 1030, in the event that a plurality of mobile stations 90 are detected within defined coverage area 55 of stage 1000, enablement of the provision of the product or service of stage 1020 is prevented. In optional stage 1040, in the event that provision of the product or service is not enabled, a visual or audio notification is provided to the user.

Figure 2A:
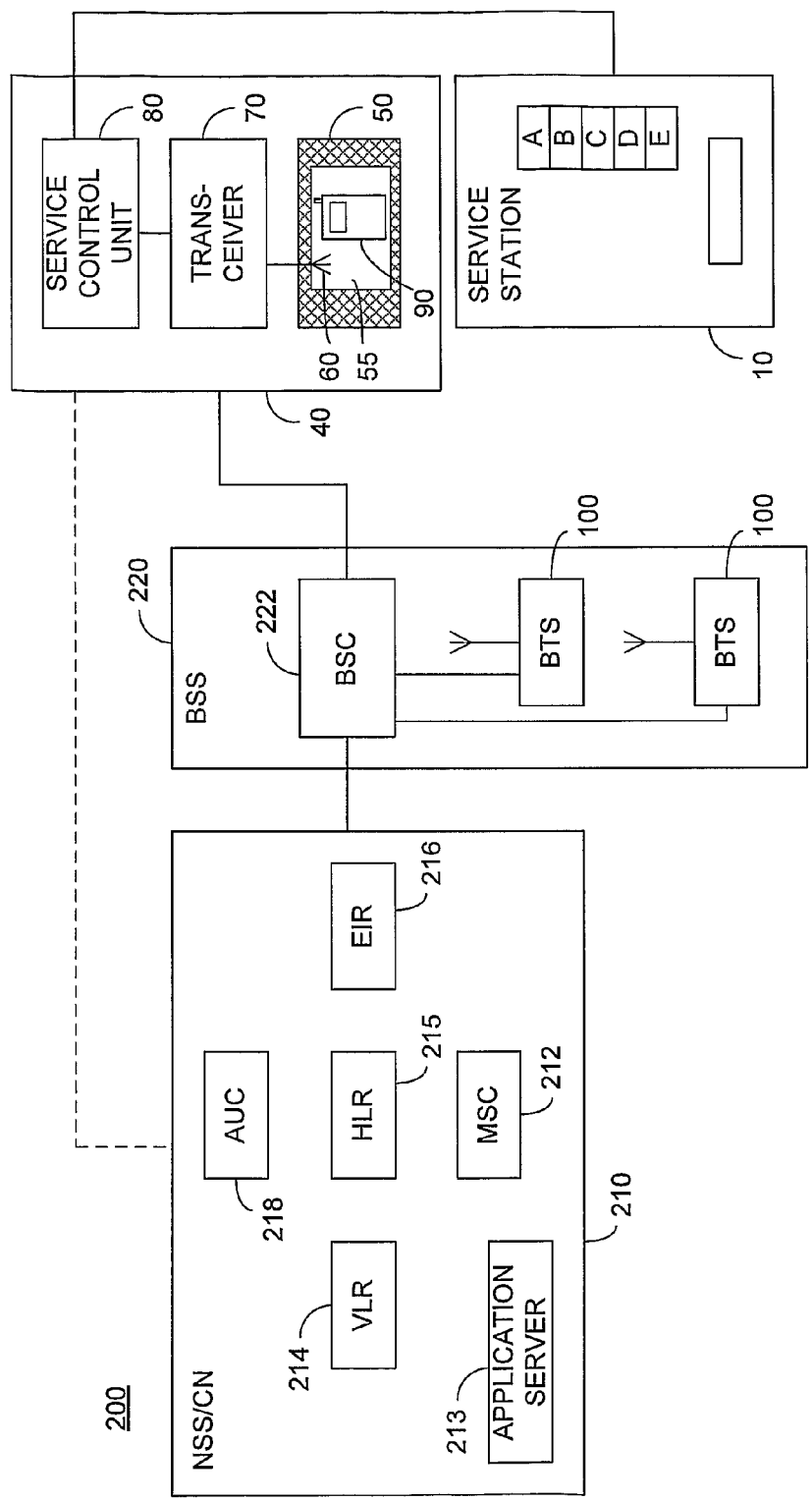
FIG. 2A illustrates a high level block diagram of an exemplary embodiment of a system providing a product or service in cooperation with both a mobile station and a cellular telephone network, where an application server is provided associated with a network switching subsystem or core network.

FIG. 2A illustrates a high level block diagram of an exemplary embodiment of a system 200 providing a product or service in cooperation with both a mobile station and a cellular telephone network, where an application server is provided associated with a network switching subsystem or core network. System 200 comprises a Network Switching Subsystem (NSS) or Core Network (CN) 210, a Base Station Subsystem (BSS) 220, known in other systems as a Radio Network Subsystem (RNS), a mobile station identifier device 40 and a service station 10. BSS 220 comprises: a Base Station Controller (BSC) 222, known in other systems as a Radio Network Controller (RNC), and at least one BTS 100, which as indicated above, in other standard terminology may also be called, for example, Node-B or eNode-B. Each BTS 100 may define a cell, for example, by the coverage of an antenna associated therewith. A mobile station may be attributed to a particular cell, for example, if the signal received by the mobile station from the corresponding BTS 100 antenna has a better quality than the signals received from other BTS 100 antennas, either because this BTS 100 antenna is closer and/or because there are fewer obstacles between the BTS 100 antenna and the mobile station.

NSS/CN 210 comprises: a mobile services switching center (MSC) 212, which in different possible configurations and/or in other standard terminology may also be called, for example, GMSC, MTX, 3GMSC, SGSN, access GW or IWF-MSC; an application server 213 (for example, a gsmSCF); a visitor location register (VLR) 214; a home location register (HLR) 215; an equipment identity register (EIR) 216; and an authentication center (AuC) 218. MSC 212 may control one or more BSS 220. NSS/CN 210 and BSS 220 may be substantially as known in the art or as provided in any mobile communication system, and will not be detailed at great length herein.

Mobile station identifier device 40 comprises a shielding 50 defining a coverage area 55 and exhibiting an antenna 60 disposed therein; a transceiver 70; and a service control unit 80, and is in all respects similar to mobile station identifier device 40 of FIGS. 1A and 1B.

Service station 10 is preferably juxtaposed with station identifier device 40, or associated therewith, and comprises any machine that provides a product or a service. Service station 10 may include, for example, a food, soft drink, a ticket vending machine, a parking fee payment machine, a movie theater ticket machine, a copier machine, a gate/door and/or any other suitable service station.

BSC 222 is in communication with each BTS 100, with mobile station identifier device 40 which preferably acts as a BTS of the cellular network of system 200 with limited capabilities, and preferably in particular with transceiver 70, and with NSS/CN 210. Service control unit 80 is in communication with transceiver 70 and service station 10, and transceiver 70 is in communication with a mobile station 90 placed within coverage area 55, the communication being accomplished via antenna 60 disposed within shielding 50. Optionally, mobile station identifier device 40 is in direct communication with NSS/CN 210, as indicated by the dashed connection, and in such an embodiment communication via BSS 220 is not typically implemented.

In operation, a mobile station 90 inserted within shielding 50 of mobile station identifier device 40, experiences a reduced signal strength from all BTS 100 and an increased signal strength from transceiver 70 via antenna 60, and as a result attempts to communicate with NSS/CN 210 through transceiver 70. In one embodiment, transceiver 70 is associated with a LAI different from the LAI associated with BTS 100 experienced by mobile station 90 immediately outside shielding 50 of mobile station identifier device 40.

Transceiver 70 is in communication with BSS 220, and BSS 220 is operative to transfer the communication attempt to NSS/CN 210. NSS/CN 210 is operative to provide a network authorization symbol for mobile station 90 for communication via transceiver 70, such as, for example, a Temporary Mobile Subscriber Identification (TMSI) code in a GSM network or Location Update Accept message in a CDMA network. In other networks a P-TMSI or TLL is provided. Transceiver 70 and mobile station 90 are thus identified by NSS/CN 210. NSS/CN 210, and in particular VLR 214, transfers identification information of mobile station 90 and transceiver 70 to application server 213.

Based on the mobile station 90 identification information stored at application server 213, and responsive to the received identification information from VLR 214, a user of mobile station 90 may be identified and debited for a product or service. In particular, service control unit 80 is operative to detect the existence of the provided network authorization symbol, and responsive to the existence of the provided network authorization symbol enable service station 10 to provide a product or service. In the event that the authentication process fails, or application server 213 denies providing the product or service to mobile station 90, NSS/CN 210 may send a rejection notification which may force the mobile station to erase its network authorization symbol. In such an event, service control unit 80 is operative to detect the reject notification and prevent service station 10 from providing a product or service. In one embodiment, a network non-authorization symbol is sent in the event that the authentication process fails or application server 213 denies provision of the product or service to mobile station 90.

In order that NSS/CN 210 may notify a mobile station 90 of an incoming call received via MSC 212, irrespective of the geographic location of mobile station 90, NSS/CN 210 typically is operative to monitor the location of each mobile station 90 powered on. Therefore, a mobile station 90 may notify NSS/CN 210 when roaming to a different location area. A location area may include a group of cells, which may have the same location area identifier (LAI), also known as a location area code. When a mobile station is powered on it may detect an LAI, which may be transmitted from BSC 222 through the cell's BTS 100. When mobile station 90 moves to another cell of another location area, mobile station 90 may detect a different LAI and thus may initiate a mobile station positioning procedure, for example, a location update procedure or a routing area update by for example, sending a location update request to VLR 214, including, for example, an identification of mobile station 90. VLR 214 may perform an authentication process with mobile station 90. For example, mobile station 90 may have a unique authentication key, which may also be stored at AuC 218. In case mobile station 90 has roamed from a cell controlled by another VLR, VLR 214 may have to receive the authentication key and possibly other authentication codes and/or details of the roaming mobile station 90 from HLR 215 and/or AuC 218 and/or from a previous VLR. After the authentication is completed, a location update may be performed, in which VLR 214 may allocate a network authorization symbol to mobile station 90. In some embodiments before allocating the network authorization symbol, VLR 214 may send details of the mobile station, for example, the real mobile identity, which in one embodiment is constituted of a Mobile Subscriber Integrated Services Digital Network Number (MSISDN), the transceiver 70 identification and the LAI, to application server 213, for example, by an intelligent network method, such as IN, CAP or any other suitable method. For example, VLR 214 may be required to send identifying information of mobile station 90 to application server 213 if the LAI is associated with a specific cell, corresponding to an application controlled by application server 213, for example, an LAI associated with transceiver 70 of mobile station identifier device 40. Based on the identifying information of mobile station 90, application server 213 may identify mobile station 90 and/or a user of mobile station 90, and decide whether to allow the mobile station positioning management procedure to be completed. If the mobile station positioning management procedure is approved by application server 213, VLR 214 may proceed to allocate a network authorization symbol to mobile station 90.

The network authorization symbol may be unique within the current location area of mobile station 90. Thus, for example, the network authorization symbol and the LAI may enable VLR 214 to recognize mobile station 90 and its location. When an incoming call is to be connected to mobile station 90, MSC 212 may locate mobile station 90, for example, by sending a paging message to all mobile stations 90 in the location area identified by the network authorization symbol associated with mobile station 90.

In one embodiment, part of the radio parameters of transceiver 70 are similar to part of the radio parameter of BTS 100 controlling the area surrounding shielding 50, thus enabling a short registration period. Shielding 50 preferably further acts to limit the coverage of transceiver 70 so as not to exhibit a radio signal strength outside of shielding 50 in excess of the radio signal strength experienced by a mobile station 90 from another BTS 100. Thus, interference with mobile devices 90 not placed within shielding 50 is minimized, and preferably reduced to near zero.

In some further detail, when mobile station 90 is configured for operation in a GSM network, mobile station 90 may include a smart card, for example, a SIM card. The smart card may store, for example, among other things, an International Mobile Subscriber Identity (IMSI), a Ciphering Key (Kc) an Authentication Key (Ki) and the above mentioned TMSI authorization code. When mobile station 90 is inserted within shielding 50, a location update process may be initiated. In particular, as described above, mobile station 90 may detect a different LAI from transceiver 70 than the LAI with which it was previously associated and initiate a location update process. Mobile station 90 may send a location update request to MSC 212 via BSS 220. The location update request may include the current TMSI stored on the smart card and the Location Area Identifier (LAI) associated with the TMSI. MSC 212 may forward these details to VLR 214 together with a message to update the LAI. In case the new LAI is controlled by the same VLR 214 as the previous LAI of mobile station 90, VLR 214 may recognize the mobile station 90 by virtue of the received TMSI and/or LAI, and preferably initiate an authentication process. VLR 214 may have authentication data stored therein specific to mobile station 90 currently within shielding 50. The authentication data may include, for example, the IMSI of mobile station 90, a random number (RAND) and a Signed Response (SRES). In case VLR 214 does not recognize mobile station 90 based on the received TMSI, for example, if the previous LAI of mobile station 90 was controlled by another VLR 214, or if mobile station 90 was not registered to the network associated with VLR 214 or/and was off before inserted into shielding 50, VLR 214 may request and receive the authentication data from HLR 215 and/or from the previous VLR 214. The IMSI of mobile station 90 may be received by VLR 214 as part of the authentication data and may be used in order to request the details corresponding to mobile station 90 from HLR 215 and/or from the previous VLR 214. A new RAND and SRES may be generated by AuC 218 and sent to HLR 215, for example, after each authentication process or after some authentication processes.

VLR 214 may initiate the authentication process by sending the RAND together with an authentication request to mobile station 90. Mobile station 90 may compute an SRES based on the Ki stored in the smart card therein, and the received RAND, by a predetermined algorithm, which may be notated, for example, by A3, which may use the stored Ki and the received RAND together as an input. Algorithm A3 is operative to compute an SRES, and the computed SRES is transmitted to VLR 214 as part of a response to the authentication request. VLR 214 is operative to compare the computed SRES sent by mobile station 90 with an SRES stored thereon, or computed therein, and confirm that the received SRES matches the stored, or locally computed SRES of VLR 214. If the SRES received from mobile station 90 is identical with the stored, or locally computed SRES, authentication is successful. The authentication process may prevent duplication of mobile stations 90, for example, since in the authentication process a random number RAND may be transmitted through the network, while the keys and algorithms for the process may be stored at mobile station 90 and an authentication center, which may produce the SRES. In case mobile station 90 is duplicated, the duplicated mobile station 90 may not be able to produce a SRES which is identical to the SRES stored in VLR 214.

If the authentication succeeds, VLR 214 may generate and/or allocate a new TMSI to mobile station 90, the TMSI acting as a network authorization symbol. The new TMSI may be transmitted to mobile station 90 in a ciphered mode, the ciphering being accomplished by VLR 214 in cooperation with a Kc associated with the particular mobile station 90. The ciphering method may be computed, for example, based on Kc and RAND, by a predetermined algorithm, which may be notated, for example, by A8, which may use Kc and RAND together as an input. Mobile station 90 is similarly equipped with algorithm A8 to decipher the received TMSI.

In an exemplary embodiment, VLR 214 postpones the sending of the network authorization symbol, in one particular embodiment the TMSI, to mobile station 90 until a confirmation from application server 213 is received. Application server 213 may receive information from VLR 214, for example, location update details and/or a mobile station identification information, such as, for example, the real mobile identity and/or the LAI, together with a request for confirmation. VLR 214 may send the request for confirmation in case the current LAI of the mobile station is associated with a cell corresponding to an application controlled by application server 213, for example, transceiver 70 associated with shielding 50. Application server 213 may identify a user of mobile station 90 based on mobile station identification information received from VLR 214. Application server 213, responsive to the received mobile station identification information, decides whether to approve or decline the mobile station positioning management procedure. In some embodiments, application server 213 may include a list of mobile station identification information for approved users and application server 213 is operative to approve the mobile station positioning management procedure if the mobile station identification information received for mobile station 90 via VLR 214 matches, or is consonant with, one of the mobile station identification information in the list. In one embodiment approved users, also known as subscribers, may have a pre-paid account at the associated cellular service provider, and application server 213 may check the amount of money left in the pre-paid account in order to decide whether to approve or decline the mobile station positioning management procedure. In another embodiment, application server 213 may include a list of mobile station identification information for which the product or service of service station 10 should not be provided and application server 213 is operative to decline the mobile station positioning management procedure request from VLR 214 if the identified mobile station identification information of mobile station 90 appears in this list. Additionally or alternatively, application server 213 may perform certain inquiries in order to decide if a service should be provided to the identified user, for example, inquiry with a credit card company, a bank, or with any other suitable database. Application server 213 is preferably operative to send an approval or declination message to VLR 214. If an approval message is received, VLR 214 is operative to complete the mobile station positioning management procedure, e.g., confirm the location update to transceiver 70 and/or send the TMSI or other network authorization symbol to mobile station 90. If a declination message is received from application server 213, VLR 214 may not complete the mobile station positioning management procedure and may not confirm the location update to transceiver 70 and/or may send a network non-authorization symbol to mobile station 90. In one embodiment, VLR 214 may send a refusal message to transceiver 70. Application server 213 may operate by an intelligent network method, for example, IN, CAP or any other suitable protocol.

In case the mobile station positioning management procedure fails, for example, during the authentication process, VLR 214 may inform application server 213 and/or transceiver 70.

Service control unit 80 is operative to monitor transceiver 70 and/or the communication between mobile station 90 and transceiver 70 and detect the transmission of a network authorization symbol from NSS/CN 210 to mobile station 90. In one embodiment, service control unit 80 is further operative to identify and store the network authorization symbol, for post transaction audit needs. Advantageously service control unit 80 is operative responsive to the detection of the existence of a network authorization symbol. Service control unit 80 is further operative, responsive to the detected network authorization symbol to enable service station 10 to provide a product or service.

In the event that the authentication process and/or the location update process fails, in one embodiment a network non-authorization symbol is sent to mobile station 90, and thus detected by service control unit 80. In one embodiment, service control unit 80 is further operative to detect the location update request initiated by mobile station 90 If the network authorization symbol is not detected after a predetermined period of time from the detected location update request, service control unit 80 is not operative to enable service station 10 to provide a product or service. In one further embodiment, service control unit 80 is operative to prevent service station 10 from providing the product or service for a predetermined freeze-out period or until another mobile station 90 is detected within coverage area 55.

Service control unit 80 is preferably further operative to detect that only a single mobile station 90 is within coverage area 55 at a time. In one embodiment, transceiver 70 is operative to communicate with any mobile station 90 placed within coverage area 55, and service control unit 80 is operative to detect a plurality of mobile station positioning management procedures, in particular location update requests and/or network authorization symbols. In the event that a plurality of location update requests and/or network authorization symbols are detected prior to the completion of the delivery of the service or product from service station 10, preferably delivery of the service or product is inhibited, thus avoiding confusion as to which mobile station 90 user is to receive the service or product.

In the event that service control unit 80 does not enable service station 10 to provide a product or service after detection of a mobile station 90 inserted within coverage area 55, service control unit 80 is preferably further operative to provide an audible and/or visual notification of the denial. Additionally or alternatively, application server 213 may instruct NSS/CN 210 to send a message to mobile station 90, which may indicate failure and/or success of the process, and including further information.

Service control unit 80 is shown associated with a single transceiver 70, a single shielding 50 and a single service station 10, however this is not meant to be limiting in any way. In another embodiment, a single service control unit 80 controls a plurality of service stations 10. Similarly, a single transceiver 70 may control a plurality of coverage areas 55, preferably provided that communication between transceiver 70 and each coverage area 55 is separately identifiable by service control unit 80.

In some embodiments, a cellular service provider associated with NSS/CN 210 may collect the money from the user associated with mobile station 90 for the product or service provided by service station 10. For example, the cellular service provider may have a payment settlement with the operator of service station 10, for example, in which the cellular service provider pays the service operator and then collects the money from the user, or alternatively, the cellular service provider may pay the service operator only after collecting the money from the user. Alternatively, the cellular service provider may also be the operator of service station 10.

In an embodiment of the present invention, mobile station 90 may be a prepaid device, e.g., the calls and/or other operations done by mobile station 90 may be prepaid. In this case, for example, the debit for the service provided by service station 10 may be subtracted from the pre-paid amount.

In other embodiments, as described in more detail hereinto below, the operator of service station 10 may collect the charge for the service in a variety of ways. In those embodiments, an additional identification process may be required in order that the operator may identify the user.

In one embodiment, service control unit 80 is associated with a plurality of shieldings 50, and a product or service from service station 10 is provided only after network authorization symbols are detected for mobile stations 90 inserted within each shielding 50.

Figure 2B:
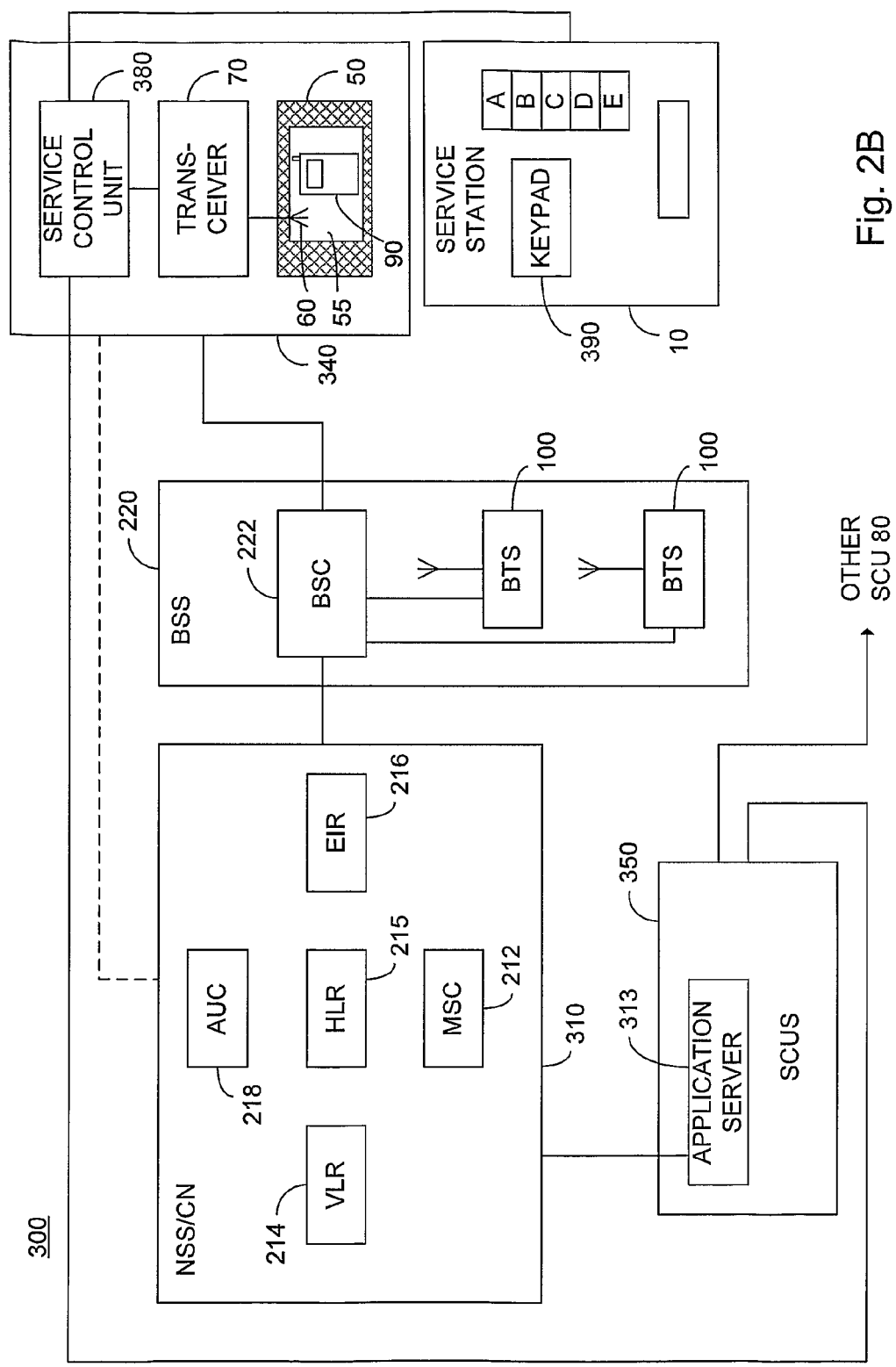
FIG. 2B illustrates a high level block diagram of an exemplary embodiment of a system providing a product or service in cooperation with both a mobile station and a cellular telephone network, where an application server is provided in communication with a network switching subsystem or core network.

FIG. 2B illustrates a high level block diagram of an exemplary embodiment of a system 300 for providing a product or service in cooperation with both a mobile station and a cellular telephone network, where an application server is provided in communication with a network switching subsystem or core network. System 300 comprises a NSS or CN 310, a Service Control Unit Server (SCUS) 350, a BSS or RNS 220, a mobile station identifier device 340 and a service station 10. BSS 220 comprises: a BSC 222, which as described above is known in other systems as an RNC, and at least one BTS 100, which as indicated above, in other standard terminology may also be called, for example, Node-B or eNode-B. Each BTS 100 may define a cell, for example, by the coverage of an antenna associated therewith. A mobile station may be attributed to a particular cell, for example, if the signal received by the mobile station from the corresponding BTS 100 antenna has a better quality than the signals received from other BTS 100 antennas, for example, either because this BTS 100 antenna is closer and/or because there are fewer obstacles between the BTS 100 antenna and the mobile station.

NSS/CN 310 comprises: an MSC 212, which in different possible configurations and/or in other standard terminology may also be called, for example, GMSC, MTX, 3GMSC, SGSN, access GW or IWF-MSC, a VLR 214, a HLR 215, an DR 216 and an AuC 218. MSC 212 may control one or more BSS 220. NSS/CN 310 and BSS 220 may be substantially as known in the art or as provided in any mobile communication system, and will not be detailed at great length herein. SCUS 350 comprises an application server 313.

Mobile station identifier device 340 comprises a shielding 50 defining a coverage area 55 and exhibiting an antenna 60 disposed therein; a transceiver 70; and a service control unit 380, and is in all respects similar to mobile station identifier device 40 of FIGS. 1A and 1B. Service station 10 is preferably juxtaposed with mobile station identifier device 340, or associated therewith, and comprises any machine that provides a product or a service. Service station 10 may include, for example, a food, soft drink, a ticket vending machine, a parking fee payment machine, a movie theater ticket machine, a copier machine, a gate/door and/or any other suitable service station. Service station 10 optionally exhibits an entry module 390, implemented without limitation as a keypad.

BSC 222 is in communication with each BTS 100, with mobile station identifier device 340 which preferably acts as a BTS of the cellular network of system 200 with limited capabilities, and preferably in particular with transceiver 70, and with NSS/CN 310. Service control unit 380 is in communication with transceiver 70 and service station 10, and transceiver 70 is in communication with a mobile station 90 placed within coverage area 55, the communication being accomplished via antenna 60 disposed within shielding 50. Optionally, mobile station identifier device 340 is in direct communication with NSS/CN 310, as indicated by the dashed connection, and in such an embodiment communication via BSS 220 is not typically implemented. SCUS 350 is preferably in communication with each service control unit 380. It is to be understood that while only a single service control unit 380 is shown in detail a plurality of service control units 380, and a plurality of mobile station identifier devices 340 may be provided without exceeding the scope.

In operation, system 300 is operative in all respects similar to the system 200 described above, with the exception of the operation of SCUS 350 and application server 313 constituted therein. In particular, application server 313 is operative in all respects similar to the operation of application server 213 of system 200 to allow VLR 214 to send the network authorization symbol to mobile station 90, mobile station identifier device 340 is operative in all respects similar to the operation of mobile station identifier device 40 and service control unit 380 is operative in all respects similar to the operation of service control unit 80, except as described below.

SCUS 350 is further operative to receive from VLR 214 a communication reference number for each network authorization symbol enabled by application server 213. VLR 214 is further operative to transmit the communication reference number along with the network authorization symbol to mobile station 90. Service control unit 380 is operative to detect the existence of the network authorization symbol, and is further operative to identify and store the transaction reference number, preferably associated with a date/time stamp. Service control unit 380 is further operative to store transaction information associated with the received transaction reference number, the transaction information being received from service station 10 and associated with the enabled delivery of product or service. In one embodiment, transaction information comprises a price for the product or service delivered, and in another embodiment a code associated with the product or service delivered. Advantageously, a user may select from a plurality of differently priced products or services and authorization for the delivery of the product or service is not associated with the pricing information.

Optionally, SCUS 350 is periodically in communication with service control unit 80, to retrieve transaction information and the associated communication reference number. SCUS 350 is further operative to arrange for payment for the retrieved transaction information responsive to the associated communication reference number.

In greater detail, SCUS 350 may include the payment details of the user, for example, payment means details and/or the amount of the user credit. Application server 313 may identify the user based on mobile station 90 details received from NSS/CN 310, which in one embodiment is a cellular phone number of mobile station 90. Based on the identity of the user, application server 313 may decide whether to enable providing a product or service from service station 10 to a user associated with mobile station 90. The decision may be made based on data received from NSS/CN 310, data stored on SCUS 350 and/or other databases. If the user associated with mobile station 90 is approved for receiving a service, application server 313 sends a confirmation to NSS/CN 310 which may complete the location update procedure as described above in relation to system 200. NSS/CN 310 further provides, responsive to the authorization from application server 313 a communication reference number, which is sent by NSS/CN 310 along with the network authorization symbol to mobile station 90. SCUS 350 preferably receives from application server 313 a notification of the authorization provided to NSS/CN 310 along with the communication reference number and mobile station 90 details received from NSS/CN 310

Application server 313 is operative to match mobile station 90 details received from NSS/CN 310 with details of approved subscribers. For example, application server 313 may include a table including the identities of the subscribers and/or, for example, the payment means details of the subscribers, alternatively, application server 313 may be in communication with databases including details of users, for example, data-bases included in SCUS 350. After application server 313 identifies the subscriber based on the mobile station 90 details, preferably it allows NSS/CN 310 to proceed with the location update process. In case the mobile station 90 details does not match the subscribers' details, application server 313 may send a rejection message to NSS/CN 310, which may send a rejection message or a network non-authorization symbol to mobile station 90 accordingly.

In one embodiment, service control unit 80 may require additional input from a user, such as, for example, a personal code and/or other identification. Service control unit 80 may require the input on entry module 390 associated with service station 10, and preferably provides the additional input to SCUS 350 prior to enabling the provision of the product or service. In an alternative embodiment, the additional input is provided via a keypad of mobile station 90. In the event that additional input is consonant with pre-stored authorization information, SCUS 350 provides a second level authorization directly to service control unit 80 to enable provision of the product or service from service station 10. In yet another embodiment the additional input entered by the user may be received by application server 313 and may be further used to facilitate the authorization of mobile station 90 by application server 313 to NSS/CN 310.

Figure 2C:
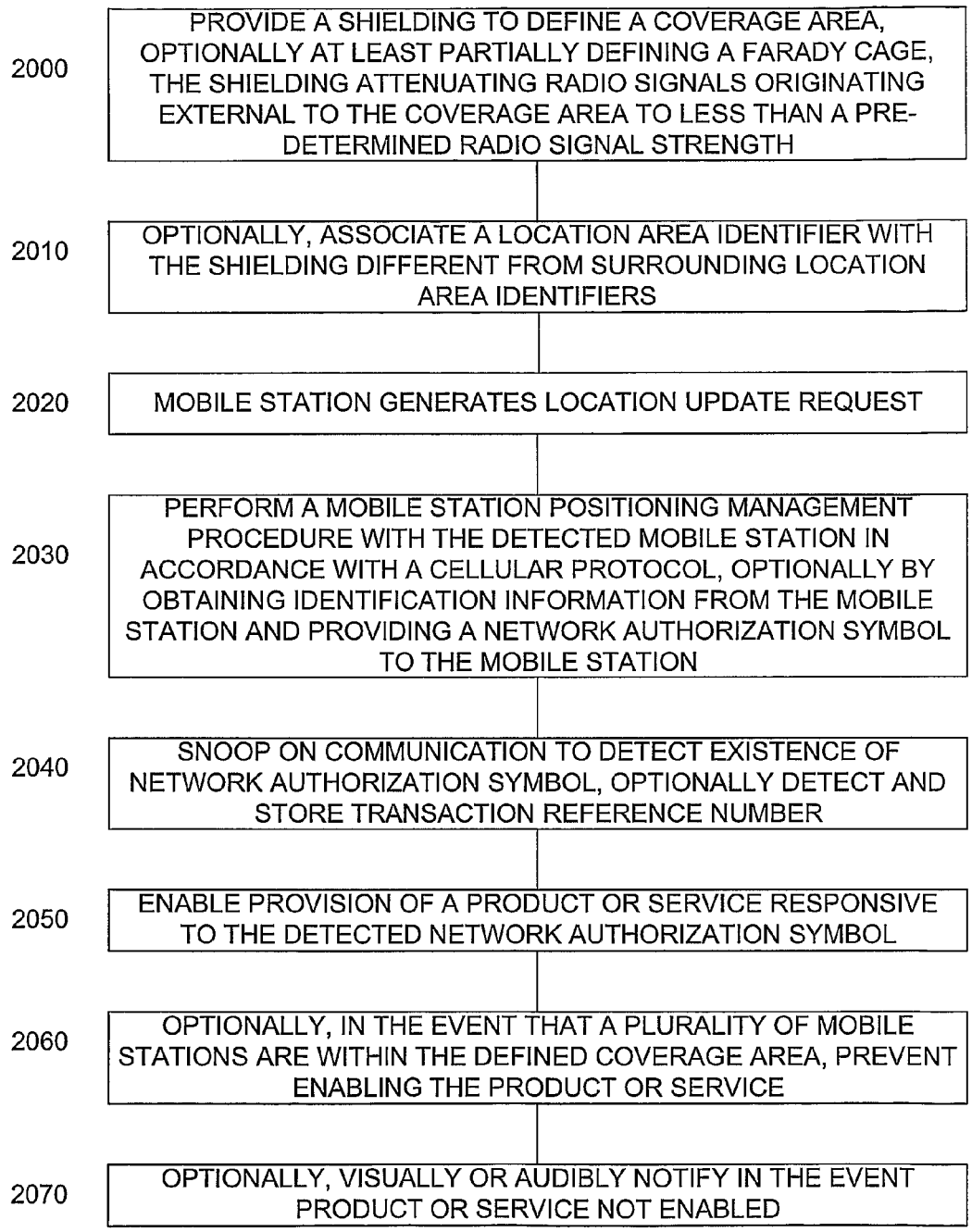
FIG. 2C illustrates a high level flow chart of an exemplary embodiment of the operation of the systems of FIGS. 2A, 2B.

FIG. 2C illustrates a high level flow chart of an exemplary embodiment of the operation of the systems of FIGS. 2A, 2B. In stage 2000, shielding 50 is provided defining coverage area 55. Optionally, shielding 50 at least partially defines a Faraday cage. Shielding 50 is arranged to attenuate radio signals originating external to defined coverage area 55 to be lower than a pre-determined radio signal strength.

In optional stage 2010, an LAI is associated with coverage area 55 different from the LAI experienced by mobile stations immediately outside of coverage area 55, i.e. different from the surrounding LAI. In stage 2020 a mobile station within the provided coverage area 55 of stage 2000 is operative to generate a location update transaction, or request.

In stage 2030, a mobile station positioning management procedure is performed with the mobile station of stage 2020, in accordance with a cellular network protocol. Optionally, the mobile station positioning management procedure comprises a location update transaction that may obtain identification information from the mobile station of stage 2020 and providing a network authorization symbol to the mobile station.

In stage 2040, the communication of the mobile station positioning management procedure is snooped, and in particular the existence of a network authorization symbol is detected. Optionally, a communication reference number is further detected and stored.

In stage 2050, responsive to the detected network authorization symbol of stage 2040, provision of a product or service is enabled. In optional stage 2060, in the event that pluralities of mobile stations are detected within defined coverage area 55 of stage 2000, enablement of the provision of the product or service of stage 2050 is prevented. In optional stage 2070, in the event that provision of the product or service is not enabled, a visual or audio notification is provided to the user.

Figure 3A:
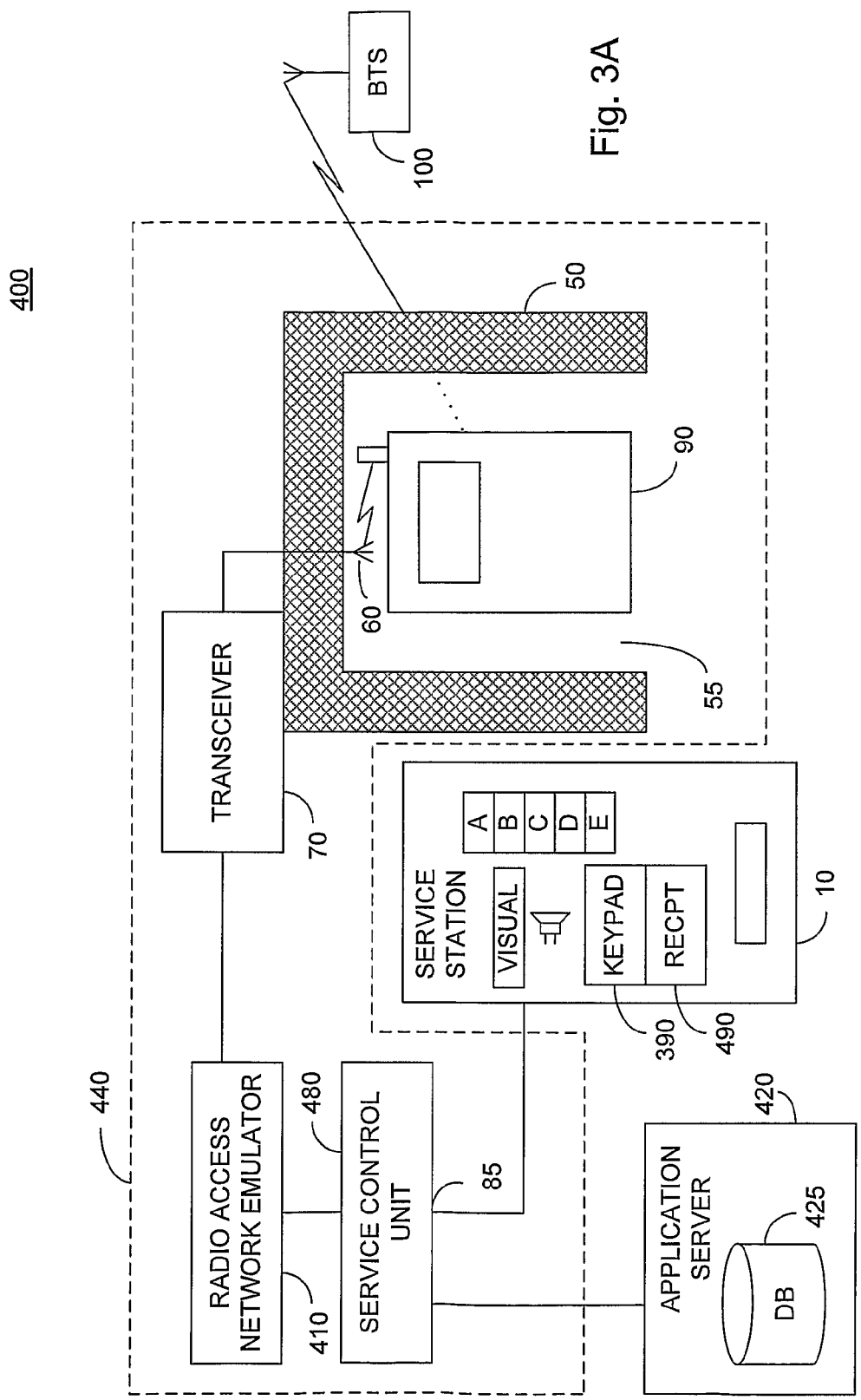
FIG. 3A illustrates a high level block diagram of an exemplary embodiment of a system providing a product or service in cooperation with a mobile station providing identification of the mobile station without reference to a cellular network.

FIG. 3A illustrates a high level block diagram of an exemplary embodiment of a system 400 providing a product or service in cooperation with a mobile station providing mobile station identification without reference to a cellular network. System 400 comprises: a service station 10, a mobile station identifier device 440, an application server 420 and a BTS 100. Mobile station identifier device 440 comprises: a shielding 50 defining a coverage area 55; an antenna 60; a transceiver 70; a radio access network emulator 410; a service control unit 480 exhibiting an output port 85; and a mobile station 90. Mobile station 90 may be inserted and removed by a user from coverage area 55 defined by shielding 50. Application server 420 comprises a database 425. Service station 10 optionally exhibits an entry module 390, implemented without limitation as a keypad, and an output device 490, implemented without limitation as a printer. In one embodiment radio access network emulator 410 is incorporated within service control unit 480.

Transceiver 70 is in communication with antenna 60 and with radio access network emulator 410. Service control unit 480 is in communication with radio access network emulator 410, with application server 420 and with service station 10.

Shielding 50, coverage area 55, BTS 100, mobile station 90 and service station 10 operate in all respects similar the like numbered items of FIG. 1A. Radio access network emulator 410, which in one embodiment is implemented in a general purpose micro-controller, FPGA or DSP, is arranged to retrieve the identity from mobile station 90 inserted within coverage area 55. In general, radio access network emulator 410 is operative to mimic the operation of a cellular network, to the extent necessary to obtain identification information regarding mobile station 90 inserted within coverage area 55.

In greater detail, radio access network emulator 410 is operative to detect a mobile station 90 inserted within coverage area 55 by continuously, or periodically, transmitting a broadcast signal via transceiver 70 indicative of a base station associated with a cellular network at a signal strength greater than the predetermined radio signal strength of BTS 100 within coverage area 55, which has been attenuated by shielding 50. Broadcast signals associated with one or more cellular networks may be transmitted without exceeding the scope. In one embodiment, the broadcasts signals from transceiver 70 are associated with an LAI different from the LAI associated will other BTS 100 units in the vicinity thereof.

Mobile station 90 is operative responsive to the broadcast signal from radio access network emulator 410, which is of greater signal strength within coverage area 55 than the signal from BTS 100, due to the action of shielding 50, to transmit a location update request, which may include the current network authorization symbol, such as a TMSI, and the LAI associated with the current network authorization symbol. Radio access network emulator 410 is operative responsive to the transmitted location update request, to transmit an identity request message, also known as an identity request signal, to mobile station 90. It is to be understood that radio access network emulator 410 is not required to decipher the current network authorization symbol, and in one embodiment takes no action utilizing the actual data in the location update request. Typically, an identity request message is composed of a concatenation of several fields. In GSM and UMTS embodiments, one of the concatenated fields is type of identity field, and the field may be set to retrieve identification information associated with the actual device of mobile station 90. In one particular embodiment, setting the type of identity field to an 001 binary value is understood by mobile station 90 to be a request for the IMSI. In another particular embodiment, setting the type of identity field to an 010 binary value is understood by mobile station 90 to be a request for the International Mobile Equipment Identity (IMEI). In yet another particular embodiment, setting the type of identity field to an 011 binary value is understood by mobile station 90 to be a request for the International Mobile Equipment Identity and Software Version (IMEISV).

Mobile station 90, responsive to the transmitted identity request message, responds by transmitting identification information, preferably responsive to the type of identity field. Radio access network emulator 410 is operative to retrieve the requested identity information from the response, and forward the retrieved identity information to service control unit 480. Service control unit 480, in cooperation with application server 420, and in particular database 425 thereof, is operative to compare the retrieved identity information with identity information stored on database 425. In the event that retrieved identity information is consonant with identity information stored on database 425, service control unit 480 is operative via output port 85 to signal service station 10 to provide a product or service.

Service control unit 480 is preferably in communication via a network, such as the Internet or a closed network, with application server 420. Application server 420 is operative to provide an interface allowing for the loading of authorized identity information into database 425. Database 425 may be shared among may service control units 480. Service control unit 480 is preferably further operative to output to a billing system, or other charging network, an indication of the charge for the particular product or service provided by service station 10 associated with the authorized identity information. In one embodiment, the billing is accomplished in cooperation with application server 420, and optionally a transaction record is provided to the user via output device 490. Service control unit 480 may require an additional input on entry module 390 associated with service station 10 prior to enabling the provision of the product or service. In an alternative embodiment, the additional input is provided via a keypad of mobile station 90.

Figure 3B:
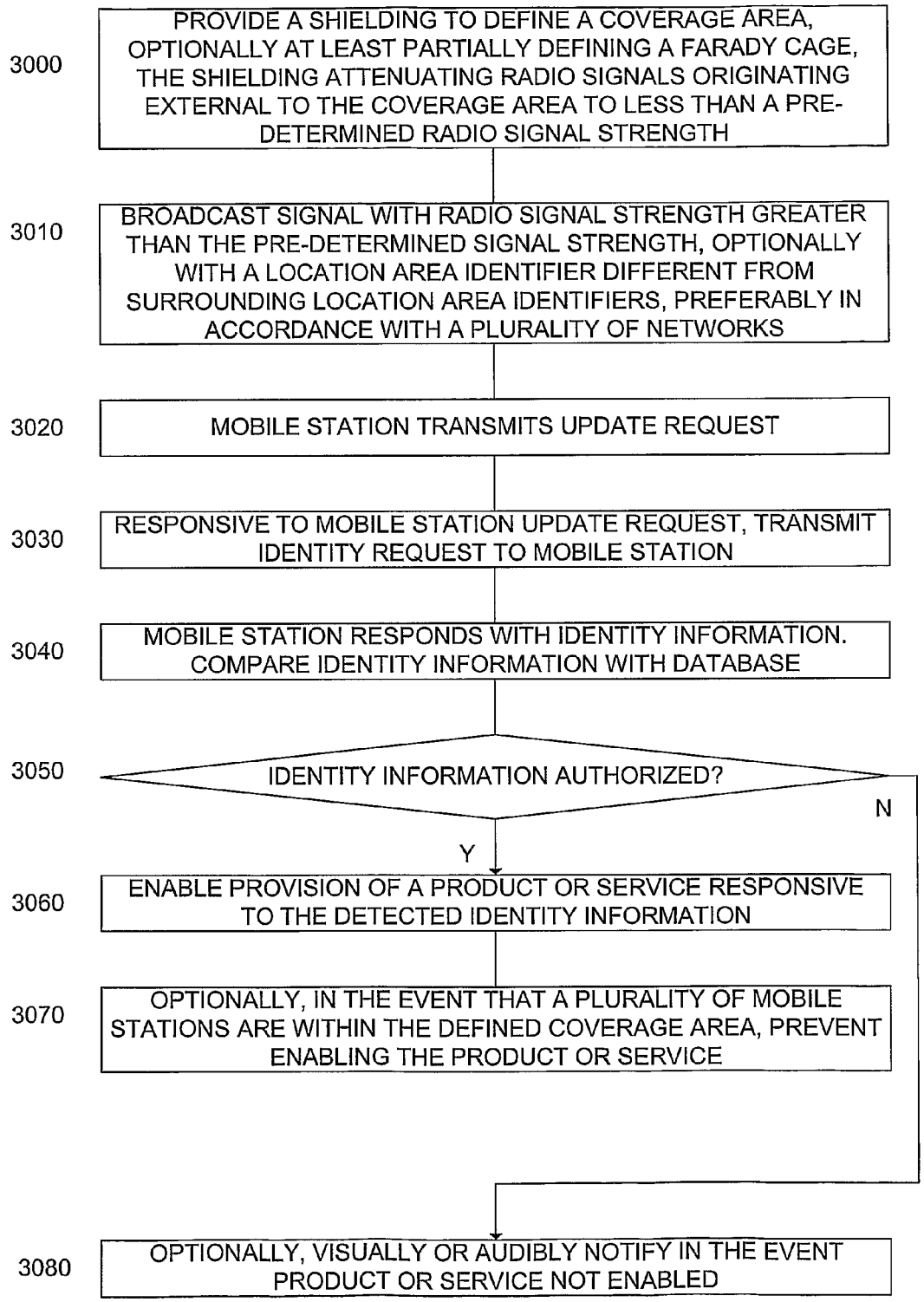
FIG. 3B illustrates a high level flow chart of an exemplary embodiment of the operation of the system of FIG. 3A.

FIG. 3B illustrates a high level flow chart of an exemplary embodiment of the operation of the system of FIG. 3A. In stage 3000, shielding 50 is provided defining coverage area 55. Optionally, shielding 50 at least partially defines a Faraday cage. Shielding 50 is arranged to attenuate radio signals originating external to defined coverage area 55 to be less than a pre-determined radio signal strength.

In stage 3010 a broadcast signal is transmitted within coverage area 55 with a radio signal strength greater than the pre-determined signal strength of stage 3000. Optionally, the broadcast signal associated with coverage area 55 exhibits an LAI different from the LAI experienced by mobile stations immediately outside of coverage area 55, i.e. different than the surrounding LAI. Preferably, a plurality of broadcast signals are transmitted each associated with one of the cellular networks surrounding coverage area 55.

In stage 3020, responsive to the broadcast signal, the mobile station within coverage area 55 transmits a location update request. In stage 3030, responsive to the location update request of stage 3020, an identity request is transmitted to the mobile station within coverage area 55. Preferably, the identity request exhibits a field set to retrieve identity information associated with one of the hardware of the mobile station or an identifier of a smart card inserted therein.

In stage 3040, the mobile station within coverage area 55 responds to the identity request of stage 3030 with identity information. The received identity information is compared with identity information stored in a database of authorized identity information, and in stage 3050 the comparison is analyzed. In the event that the identity information is authorized identity information, in stage 3060 provision of the product or service is enabled. In optional stage 3070, in the event that a plurality of mobile stations are detected within defined coverage area 55 of stage 3000, enablement of the provision of the product or service of stage 3060 is prevented.

In the event that in stage 3050 the identity information is not authorized identity information, provision of the product or service is not enabled, and in optional stage 3080 a visual or audio notification is provided to the user.

Thus, the present embodiments enable providing a product or service responsive to a mobile station. In particular, a shielding is provided defining a coverage area, the shielding arranged to attenuate radio signals originating from any antenna outside of the coverage area to be less than a pre-determined signal strength. An antenna is provided within the defined coverage area, and coupled to a transceiver. The transceiver is operative to communicate with any mobile station placed within the defined coverage area with a radio signal greater than the pre-determined strength. A service control unit is provided and arranged to be responsive to the communication between the transceiver and the mobile station. A service station providing a product or service, preferably in proximity to the defined coverage area, is operative to provide the product or service responsive to the service control unit.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

The terms "include", "comprise" and "have" and their conjugates as used herein mean "including but not necessarily limited to". The term "connected" is not limited to a direct connection, and connection via intermediary devices is specifically included.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

We claim:

1. A system for providing a product or service using a mobile station, the system comprising:
    a shielding defining a coverage area, said shielding arranged to attenuate radio signals originating externally of said coverage area to be less than a pre-determined signal strength;
    an antenna associated with said defined coverage area;
    a transceiver coupled to said antenna and in communication with a cellular network, said transceiver arranged to communicate, via said antenna, with a mobile station inserted within said defined coverage area utilizing a signal strength greater than said pre-determined signal strength, the mobile station arranged to generate a location update request responsive to an antenna portion of the mobile station being inserted within said defined coverage area, said transceiver arranged to transmit the location update request to the cellular network and receive from the cellular network, responsive to the transmitted location update request, a transmitted network authorization symbol arranged to authorize the mobile station to access the cellular network;
    a service control unit; and
    a service station arranged to provide the product or service responsive to said service control unit,
    said service control unit arranged to:
        snoop the communication between the cellular network and the mobile station;
        detect the transmission of the network authorization symbol from the cellular network to the mobile station inserted within said defined coverage area; and
        enable said service station to provide said product or service responsive to said snooped detected transmission of the network authorization symbol.

2. A system according to claim 1, wherein said service control unit is further arranged to prevent said service station from providing the product or service in the event that a plurality of mobile stations are contemporaneously present within said defined coverage area.

3. A system according to claim 1, wherein said transceiver is associated with a location area identifier different than a location area identifier experienced by the mobile station immediately outside said defined coverage area.

4. A system according to claim 1, further comprising an application server in communication with said cellular network, said application server arranged to receive an identification of the mobile station from said cellular network, and alternately provide an authorization of said service, or deny an authorization of said service, responsive to said received identification of the mobile station, said cellular network arranged to provide said network authorization symbol responsive to said provided authorization.

5. A system according to claim 4, wherein said application server is further arranged to debit a user associated with said mobile station for said provision of said product or service.

6. A system according to claim 1, further comprising a radio access network emulator coupled to said transceiver, said radio access network emulator arranged to receive identification information from the mobile station.

7. A system according to claim 6, wherein said radio access network emulator is arranged to:
   broadcast a signal with said signal strength greater than said pre-determined signal strength;
   receive the location update request responsive to said broadcast signal; and
   transmit, responsive to said received location update request, an identity request to the mobile station,
   wherein said received identification information is responsive to said transmitted identity request.

8. A system according to claim 6, further comprising a database of authorized identification information in communication with said service control unit, said service control unit arranged to further enable said service provision responsive to said received device identification information consonant with authorized identification information on said database.

9. A mobile station identifier device, comprising:
   a shielding defining a coverage area, said shielding arranged to attenuate radio signals originating externally of said coverage area to be less than a pre-determined signal strength;
   an antenna associated with said defined coverage area;
   a transceiver coupled to said antenna and in communication with a cellular network, said transceiver arranged to communicate, via said antenna, with a mobile station inserted within said defined coverage area utilizing a signal strength greater than said pre-determined signal strength, the mobile station arranged to generate a location update request responsive to an antenna portion of the mobile device being inserted within said defined coverage area, said transceiver arranged to transmit said location update request to the cellular network and receive from the cellular network, responsive to the transmitted location update request, a transmitted network authorization symbol arranged to authorize the mobile station to access the cellular network; and
   a service control unit arranged to:
      snoop the communication between the cellular network and the mobile station;
      detect the transmission of the network authorization symbol from the cellular network to the mobile station inserted within said defined coverage area; and
      output a signal indicative of an authorization to provide a product or service responsive to said snooped detected transmission of the network authorization symbol.

10. A mobile station identifier device according to claim 9, wherein said service control unit is further arranged to prevent said service station from providing the product or service in the event that a plurality of mobile stations are contemporaneously present within said defined coverage area.

11. A mobile station identifier device according to claim 9, further comprising a radio access network emulator coupled to said transceiver, said radio access network emulator arranged to receive identification information from the mobile station.

12. A mobile station identifier device according to claim 11, wherein said radio access network emulator is arranged to:
   broadcast a signal with said signal strength greater than said pre-determined signal strength;
   receive the update request responsive to said broadcast signal; and
   transmit, responsive to said received update request, an identity request to the mobile station,
   wherein said received device identification information is responsive to said transmitted identity request.

13. A method of providing a product or service using a mobile station, the method comprising:
   providing a shielding to define a coverage area, said shielding arranged to attenuate radio signals originating externally of said coverage area to be less than a pre-determined signal strength;
   providing a transceiver arranged to communicate with a mobile station whose antenna portion is inserted within said defined coverage area utilizing a signal strength greater than said pre-determined signal strength;
   performing a mobile station positioning management procedure with the mobile station whose antenna portion is inserted within said defined coverage area, the mobile station generating a location update request responsive to the insertion of the mobile station antenna portion within said defined coverage area, the mobile station positioning management procedure performed in cooperation with a cellular network, the cellular network transmitting a network authorization symbol to the mobile station whose antenna portion is inserted within said defined coverage area via the provided transceiver, the network authorization symbol arranged to authorize the mobile station to access the cellular network;
   snooping on the communication between the mobile station and the cellular network to detect the transmission of the network authorization symbol; and
   enabling provision of the product or service responsive to said detected snooped transmission of the network authorization symbol.

14. A method according to claim 13, wherein said communication between the mobile station and the cellular network is in accordance with an established cellular network protocol.

15. A method according to claim 13, further comprising:
   preventing, in the event that a plurality of mobile stations are within said defined coverage area, said provision of the product or service to any of the plurality of mobile stations.

16. A method according to claim 13, further comprising associating a location area identifier with said provided coverage area different than a location area identifier experienced by the mobile station immediately outside said defined coverage area.

17. A method according to claim 13, further comprising:
   obtaining an identification of said mobile station; and
   providing an authorization of said product or service responsive to said obtained identification of said mobile station,
   said network authorization symbol sent responsive to said provided authorization of said product or service.

18. A method according to claim 17, further comprising:
   debiting a user associated with the mobile station for said provision of said product or service.

19. A method according to claim 13, further comprising:
   retrieving identification information from the mobile station,
   said enabling further responsive to said retrieved identification.

20. A method according to claim 19, wherein said retrieving identification information comprises:
   broadcasting a signal with said signal strength greater than said pre-determined signal strength;
   receiving the location update request from the mobile station responsive to said broadcast signal; and transmitting, responsive to said received update request, an identity request to the mobile station, wherein said retrieved identification information is responsive to said transmitted identity request.

* * * * *